(12) United States Patent
Jardin

(10) Patent No.: US 6,671,810 B1
(45) Date of Patent: *Dec. 30, 2003

(54) METHOD AND SYSTEM FOR ESTABLISHING SECURE COMMUNICATION OVER COMPUTER NETWORKS

(75) Inventor: Cary A. Jardin, San Diego, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 327 days.

(21) Appl. No.: 08/931,187

(22) Filed: Sep. 18, 1997

(51) Int. Cl.$^7$ ................................................. H04L 9/00
(52) U.S. Cl. ...................................................... 713/201
(58) Field of Search ........................... 380/49; 713/201, 713/200, 153, 156; 709/228, 250

(56) References Cited

U.S. PATENT DOCUMENTS

| | | |
|---|---|---|
| 5,455,953 A | 10/1995 | Russell |
| 5,502,766 A | 3/1996 | Boebert et al. |
| 5,535,276 A | 7/1996 | Ganesan |
| 5,539,824 A | 7/1996 | Bjorklund et al. |
| 5,548,646 A | 8/1996 | Aziz et al. |
| 5,548,721 A | 8/1996 | Denslow |
| 5,550,984 A | 8/1996 | Gelb |
| 5,657,390 A | * 8/1997 | Elgamal et al. ............... 380/49 |
| 5,727,145 A | * 3/1998 | Nessett et al. ............... 713/200 |
| 5,757,925 A | * 5/1998 | Faybishenko ................ 380/49 |
| 5,870,544 A | * 2/1999 | Curtis ......................... 713/201 |
| 5,931,917 A | * 8/1999 | Nguyen et al. ............. 709/250 |
| 5,935,212 A | * 8/1999 | Kalajan et al. ............. 709/228 |
| 6,076,167 A | * 6/2000 | Borza ......................... 713/201 |

* cited by examiner

Primary Examiner—Matthew Smithers
(74) Attorney, Agent, or Firm—Kenyon & Kenyon

(57) ABSTRACT

To provide secure communications over a network, a server on the network responds to an initiating event (such as a request sent to the server via the network by an application program) by randomly selecting a cryptographic algorithm from a shared algorithm repository, and then downloads the selected algorithm, or at least an appropriate portion of same, to the requesting application program. In the case of information being sent from the application to the server, a random encryption algorithm is selected and retrieved from the repository, and then downloaded to the requesting application. Upon receipt the encryption algorithm is dynamically linked to the application program to encrypt outgoing messages to the server. A complimentary decryption algorithm is also retrieved by the server and is dynamically linked to the server to decrypt incoming messages from the requesting application. In this manner, the requesting application contains only the knowledge needed to encrypt information, and contains no knowledge of how to decrypt this information. Only the server maintains the algorithm for the decryption of the data. The reverse would be true for data going the other way, or both the server and the application can have encryption and decryption algorithms for two way communications.

34 Claims, 1 Drawing Sheet

METHOD AND SYSTEM FOR ESTABLISHING SECURE COMMUNICATION OVER COMPUTER NETWORKS

BACKGROUND OF THE INVENTION

This invention relates in general to the field of security for communications and more particularly to the secure transportation of information over a communications network by use of randomly selected security algorithms.

The recent explosion in the number of people, organizations and businesses making use of the global communications network, i.e. the Internet, has brought forth a new era of electronic exchange of information and commerce. Associated with such use is the growing need for improvement in the ability to transmit sensitive, personal or confidential information and financial data without fear or concern of its loss or disclosure to others. The secure exchange of volatile information is a primary concern for vendor's and consumers alike. The need to be able to conduct secured transmissions is especially critical in the banking industry and in the use of credit cards and their associated financial transactions.

The current systems for securing sensitive transmission of information and data is subject to compromise. Just the possibility of such a security compromise prevents the full and efficient use of the Internet or other communications networks by those needing secure transmissions of their data. Recent efforts by a number of large financial and technical associations have not yet produced a viable, secure, and international solution.

With the current restrictions on the exportation of cryptographic algorithms, secure communication facilities have had to be bound to a lowest common denominator. That is, applications developed with secure facilities are required to use one specific algorithm that has been given special export, or internationalization status. In this way all "secure" applications contain a single point of vulnerability. For example, if a secure data stream is transmitted over a network, and a non-authorized party gains access to that information it is vulnerable due to the fact that the security method is an industry constant. Further, in the event the current industry standard security algorithm is compromised, all applications using that algorithm are vulnerable.

All current security applications are based on a single, de facto, industry standard which is the property of a single company. However, a security model based on a single algorithm, is also a model having a single point of failure.

The current invention provides the ability to utilize an almost infinite number of security algorithms. Security of the model increases with the number of available algorithms. A security model with such a capability is an improvement by several orders of magnitude over the security provided by a single algorithm model.

Other advantages and attributes of this invention will be readily discernable upon a reading of the text hereinafter.

SUMMARY OF THE INVENTION

An object of this invention is to provide the software based mechanism for the secure transportation of volatile information across a private or public network.

An additional object of this invention is to provide a robust, secure, and scalable security model not bound by a single security algorithm.

An additional object of this invention is to provide an application process to securely service a client's transmission on a communications network.

An additional object of this invention is to provide a specified security server implementation of a client's request for secured transmission on a communications network.

An additional object of this invention is to provide a means for encoding a client's transmission over a communication network that is unique to that client and transmission.

An additional object of this invention is to provide to a client requesting secured transmission on a communication network a means of doing so without the client needing knowledge of specific encryption algorithms.

An additional object of this invention is to provide a server application which upon request by the client sends a randomly selected encryption object to the client to facilitate secure communication between the client and the server.

An additional object of this invention is to provide a means for decoding a client's transmission over a communication network that is unique to that client and transmission.

An additional object of this invention is to provide a means for binding a decryption algorithm to a client's application for decoding a transmission which was encoded by a complementary randomly selected encryption algorithm.

An additional object of this invention is to provide a plurality of complement security algorithms in encryption and decryption algorithm pairs in a security algorithm library.

An additional object of this invention is to provide a plurality of encryption algorithms with each encryption algorithm capable of encoding a client's transmission on a communication network.

An additional object of this invention is to provide a plurality of decryption algorithms, with each decryption algorithm capable of decoding a client's transmission on a communication network where such transmission was encoded by a complementary encoding algorithm.

An additional object of this invention is to provide for the binding of a randomly selected security algorithm from a security algorithm library to an application of a user.

A further object of this invention is to provide the requesting application with randomly selected complement pairs of encryption and decryption algorithms as needed.

These objects, and other objects expressed or implied in this document, are accomplished by a system for secure communications over a communication medium having a server accessible via the medium; an application program communicating with the server via the medium; a plurality of security algorithms accessible to the server; means, responsive to an initiating event, for randomly selecting a security algorithm from said plurality; means for selecting a complimentary security algorithm from said plurality and communicating same to the application program; means for dynamically enabling the server to process, through the selected security algorithm, information the server transacts via the medium; and means for dynamically enabling the application program to process, through the complimentary security algorithm, information it transacts with the server via the medium. The initiating event can be a request for secure communications sent from the application program to the server via the medium. The communication can be uni-directional from the server such that the security algorithm selected by the server encodes information sent by the server to the application program, and the complimentary security algorithm downloaded by the server to the application decodes information received by the application program from the server. The communication can also be uni-directional in the other direction such that the complimentary security algorithm encodes information sent by the application program to the server, and the selected security algorithm decodes information received by the server. The communications can also be bi-directional. Also in the case of bi-directional secure communications, the selected algorithm and its complimentary algorithm can be the same so that both the server and the application use complimentary halves of the same algorithm.

DESCRIPTION OF THE PREFERRED EMBODIMENT

Figure 1:
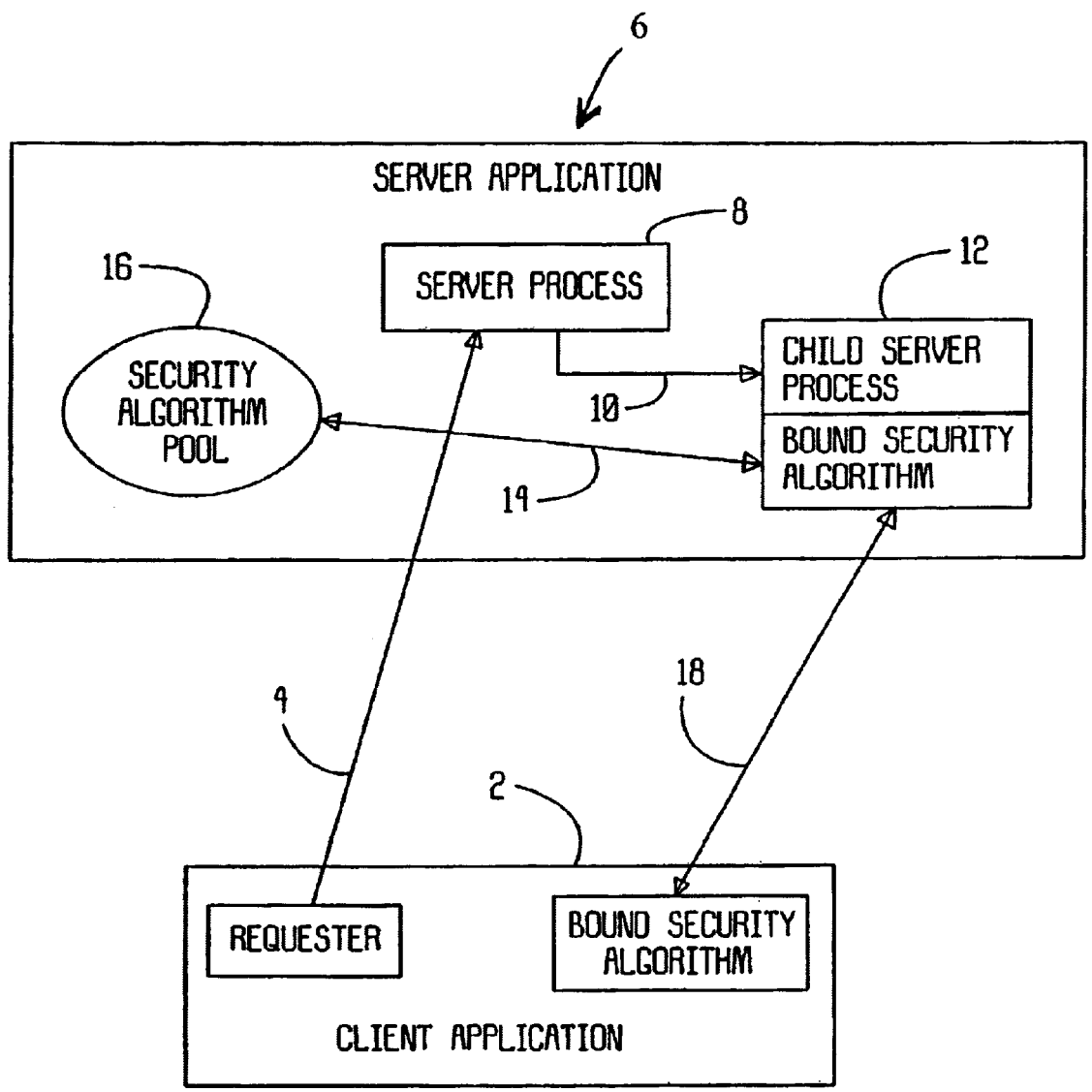
FIG. 1 is a block diagram of the security system of the present invention and its associated facilities.

The system of the instant invention provides secure communications between public or privately accessible computer applications, i.e., programs. The specific data transportation method and medium are not limited to the preferred embodiment, but rather can be any shared data transportation resource on a communications network, e.g. the Internet. The strength and flexibility of the present invention revolves around its capability to dynamically bind a randomly selected security algorithm to an executing application program, i.e., the executing application must have the ability, while executing, to link a security algorithm obtained from a network communication line. This ability can be provided, for example, by use of the JAVA programming language. The JAVA language can enable an application program to dynamically load and use external application code, or classes, e.g. security algorithms.

For illustrative purposes only, the description of the preferred embodiment uses syntax and concepts found in the JAVA programming language, however this by no means implies that the instant invention is bound to the confines of this single development language. Rather, the use of a specific language provides a more convenient way of explaining the invention. In JAVA terms, each algorithm is a class and the clients are JAVA applets (applications) being run under the JAVA virtual machine.

The system is initiated when a client application and a remote server application wish to engage in secure communications. The client can be any executing application with the previously described ability to dynamically link and use a downloaded security algorithm. The server must also have the same ability, as well as access to a pool or library of security algorithms. Both the client and server applications can initiate the process to obtain secure communications. However, the role each take are inherently different. When a security algorithm is downloaded via a communication channel, the algorithm is data, conventionally a byte stream. The client must have the ability to transform the byte stream into one or more accessible application callable routines. If it does not, the client needs to be modified with a programmatic device which can enable the client to call all the functions of the downloaded algorithm. For example, the JAVA virtual machine has an embedded class loader for the dynamic loading of class files, such as security algorithms. In this invention, the class loader takes a byte stream, the downloaded algorithm from the server, and transforms it into a class which can then be called by the client program running under the virtual machine. This requires a class loader object to be constructed so that a stream of bytes can be converted into an accessible object. For C++ the same byte stream is saved to a file and then executed.

Just as the client application needs the ability to dynamically bind and use a security algorithm in the form of application code, so does the server application. However, the server does not necessarily require a programmatic device to obtain its data from a network resource. If the security algorithms are obtained by the server via a network resource, a programmatic device similar or identical to the client's must be constructed to transform the network obtained information into an application object accessible by the server. If the security algorithms are loaded from a local files system, most development languages, like Java, provide the ability to dynamically link and use such locally accessible resources.

Once both the client and server applications have the ability to dynamically bind and use random security algorithms, they can be termed "random class enabled," and the process of selecting and using a specific security algorithm may take place. Either the client, the application without any knowledge of a specific security algorithm; or the server, the application with a locally or remotely accessible pool of security algorithms, may initiate the security process. Once the process has been initiated, the server will randomly choose a security algorithm to use for the current application session. Once the server has randomly chosen the algorithm, it will dynamically load the algorithm for its own use in communication with the client. It will then send the algorithm to the client to be dynamically loaded and used for subsequent communication transmission.

In the case of security algorithms which can be written in such a way as to contain distinct encryption and decryption algorithms, the process stated previously can be modified so that the server would dynamically bind either the encryption, or decryption side of the security algorithm, and send the other to the client.

FIG. 1 illustrates the system. A data transportation facility 2 is a random class enabled client application. The process is initiated by the client by sending a request 4 for secure communications to a random class enabled server 6. The request may be invoked in a number of different ways, including by an object constructor or a programmatic method call. Regardless of the method by which the request is made, the client must provide adequate information regarding the parties to be involved in the secure transport channel. In response to the request, a server process 8 acknowledges the request and spawns 10 a child server process 12, a separate application process, to service the requests and data transportation needs of the client application 2. It is not a requirement of the present invention to spawn a separate process for each requesting client. However, without such capability, the server process would be limited in such a way as to only allow a single client access to a secure transportation facility at any one time. Once the server process has acknowledged the request, a security algorithm must be obtained. The child server, or the server process itself, requests 14 selection of a security algorithm from a pool, i.e. library, 16 of security algorithms. The selection is done randomly. The security algorithm pool can be any accessible application code storage device, including but not limited to a computer's file system or database resource. The process by which the algorithm is chosen, may be modified to accommodate geographic, address or security level requirements of the requesting client. For example, the selection may employ a database of IP addresses and country codes. When a request is received, the IP address is used to determine the geographic region of the client request. Once located, a domestic grade algorithm can be used for requests inside the United States, or an export grade algorithm can be used elsewhere.

Based on the client's request and the particular application for the secure transportation channel, the security algorithm pool can retrieve either a single security algorithm or a set of complementary algorithms. The distinction is made by whether a selected security algorithm contains separate and distinct encryption and decryption facilities. In a case where the implementation of the current invention relies on such distinct encryption and decryption pairs, the requesting process (either the child server or the server process itself) would be presented with a pair of complementary algorithms. Each time the client initializes the process, a new, random algorithm pair is selected and utilized. The security and repetition of algorithm use is directly proportional to the number of algorithms in the repository.

Upon delivery of the requested security algorithm(s), the child server process (or the server process itself if it is handling the request) binds a copy of the received algorithm (s) for its own use in the encryption and decryption of transmitted information. It also sends the algorithm(s) over the initiated data transport communication channel 18 to the client. When the client application has received the transmitted security algorithm(s), the client binds the received code to its current application to be used to encrypt and decrypt data between it and the server 6. In the case of separate encryption and decryption algorithms, only one of the algorithms is sent to the client depending on whom is sending data to whom. For example, if the client is to send secure data to the server, only the encryption algorithm is downloaded to the client. In this manner, the client has only the knowledge needed to encrypt the data, and contains no knowledge of how to decrypt this data; and only server maintains the algorithm for the decryption of the data. The child server process preferably exists as long as the connection is active. The child server process is spawned by the server process for the sole purpose of servicing the request 4, and likewise dies when it is no longer needed.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, although the above-description of the preferred embodiment seems to differentiate between a server and an application program, but this is not necessary to practice this invention; the server can, and often is, another application program. So both parties to secure communications established according to this invention can be application programs; it is only necessary that at least one of them have access to a pool or library of security algorithms and be able to downloaded a randomly selected algorithm to the other party.

I claim:

1. A system for secure communications over a communication medium comprising:

a client without any security algorithm installed therein; and a server accessible via the medium by the client, the server being configured to communicate via the medium with the client and to run an application program including a plurality of security algorithms, wherein the server is configured to select a security algorithm from said plurality of security algorithms upon a request from the client for installation, the security algorithm selected from said plurality of security algorithms, and to transmit the selected algorithm, via the medium, to the client so that the selected security algorithm can be installed and executed at the client to provide secured data transmission.

2. The system according to claim 1, wherein the selected security algorithm encodes and decodes information communicated between the server and the client.

3. The system according to claim 1, wherein the selected security algorithm comprises an encryption algorithm executable by the server and a decryption algorithm executable by the client.

4. The system according to claim 1, wherein the selected security algorithm comprises a decryption algorithm executable by the server and an encryption algorithm executable by the client.

5. The system according to claim 1, wherein the client is configured to request the server to communicate over a secure link.

6. The system according to claim 1, wherein the server communicates the selected security algorithm to the client as a data stream, and wherein the application program is configured to transform the data stream into at least one accessible routine.

7. The system according to claim 1, wherein the application program is configured to run under a virtual machine, and wherein the virtual machine is configured to transform the selected security algorithm into program code that is accessible by the application program.

8. The system according to claim 7, wherein the virtual machine comprises a JAVA virtual machine, and further comprises a class loader which transforms the selected security algorithm into a class that is accessible by the application program.

9. A process of establishing a secure link over a communication medium having a client and a server, the process comprising:

receiving, at a server, a request from a client without any security algorithm installed therein, for a security algorithm installation, via the medium;

selecting a security algorithm from a plurality of security algorithms accessible at the server; and transmitting the selected security algorithm to the client, via the medium, so that the selected security algorithm can be installed and executed at the client to provide secured data transmission.

10. The process according to claim 9, wherein selecting the security algorithm includes randomly selecting an encryption algorithm executable by the client and a decryption algorithm executable by the server.

11. The process according to claim 9, further comprising transforming, by a virtual machine, the selected security algorithm into at least one routine that is accessible by a client application program.

12. The process according to claim 9, wherein selecting the security algorithm includes randomly selecting a decryption algorithm executable by the client and an encryption algorithm executable by the server.

13. A method of establishing a secure link over a communication network having a client and a server, the method comprising:

receiving, at a server, a request from a client without any security algorithm installed therein, for a security algorithm installation, via the network;

determining a location of the client in the network;

selecting a security algorithm from a plurality of security algorithms accessible at the server based, at least in part, on the location of the client; and communicating the selected security algorithm to the client, via the network, so that the selected security algorithm can be installed and executed at the client to provide secured data transmission.

14. The method according to claim 13, wherein selecting the security algorithm includes selecting the security algorithm based on at least one of: the geographic location, IP address, and security level of the client.

15. A system for establishing a secure link over a communication network having a client and a server, the system comprising:

means for receiving, at a server, a request from a client without any security algorithm installed therein, for a security algorithm installation;

means for selecting a security algorithm from a plurality of security algorithms accessible at the server; and means for communicating the selected security algorithm to the client, via the communication network, so that the selected security algorithm can be installed and executed at the client to provide secured data transmission.

16. The system according to claim 15, wherein the selection means selects the security algorithm based on at least one of: a random technique, geographic location of the client, IP address of the client, and security level of the client.

17. A method comprising:

receiving a request from a client application without any security algorithm installed therein, for secure communications;

randomly selecting one of a plurality of security algorithms;

transmitting the selected security algorithm from a server process to the client application; and linking the selected security algorithm to the application program, so that the selected security algorithm can be executed at the client application to provide secured communications.

18. The method according to claim 17, wherein the transmitting the request comprises the client application transmitting a request for secure communications to the server process.

19. The method according to claim 17, wherein the randomly selecting comprises the server process randomly selecting a security algorithm from a pool of security algorithms.

20. The method according to claim 19, wherein the randomly selecting of the security algorithm comprises selecting a security algorithm which accommodates requirements of the client application.

21. The method according to claim 17, wherein the linking comprises linking the selected security algorithm to the application program such that the selected security algorithm will be used by the client for subsequent communications to the server process.

22. The method according to claim 17, further comprising the server process obtaining via a network the selected security algorithm from the pool of security algorithms.

23. The method according to claim 22, wherein the selected security algorithm comprises a single security algorithm to be used by both the client application and the server process for communication therebetween.

24. The method according to claim 22, wherein the selected security algorithm comprises a pair of complimentary algorithms.

25. The method according to claim 24, wherein the transmitting the selected security algorithm from a server process to a client application comprises transmitting only one algorithm of the pair of complimentary algorithms to the client application, while keeping the other algorithm of the pair of algorithms at the server process.

26. The method according to claim 25, wherein the linking the selected security algorithm to the application program comprises linking the transmitted one of the pair of security algorithms to the client application.

27. The method according to claim 25, further comprising linking the other algorithm of the pair of algorithms to the server process.

28. The method according to claim 17, wherein said randomly selecting one of a plurality of security algorithms comprises either:

randomly selecting one of a plurality of single security algorithms to be used by both the client application and the server process; or randomly selecting one of a plurality of complimentary pairs of security algorithm;

said randomly selecting being by the server process based on the transmitted request for secure communications.

29. A method comprising:

receiving a request for secure communications at a server process from a client application without any security algorithm installed therein;

the server process randomly selecting one of a plurality of security algorithms;

the server process obtaining the selected security algorithm, the selected security algorithm including first and second complimentary security algorithms;

linking the first complimentary security algorithm to the server process;

transmitting the second complimentary security algorithm from the server process to the client application; and linking the second complimentary security algorithm to the application program, so that the selected security algorithm can be executed at the client application to provide secured communications.

30. The method according to claim 29, wherein the selected complimentary security algorithms comprise complimentary encryption and decryption algorithms.

31. A method comprising:

receiving a request from a client application without any security algorithm installed therein, for secure communications;

randomly selecting one of a plurality of security algorithms from a pool of remotely located security algorithms; and transmitting the selected security algorithm to the client application, wherein the security algorithm is to be linked with the client application and executed at the client application to provide secured communications.

32. An apparatus comprising:

a server;

a server process running on the server; the server process to select one of a plurality of security algorithms from a pool of security algorithms, upon a request from a remote client application without any security algorithm installed therein for installation a security algorithm selected from said plurality of security algorithms at the remote client application, and then transmit the selected security algorithm to the client application, so that the selected security algorithm can be executed at the remote client application and linked with the server process for use in communication between the remote client application and server process.

33. An apparatus comprising:

a server;

a server process running on the server; the server process to select one of a plurality of security algorithms from a pool of security algorithms, upon a request from a remote client application without any security algorithm installed therein for installation a security algorithm selected from said plurality of security algorithms at the remote client application, the selected security algorithm comprising a first and second complimentary security algorithms, so that the server process can keep and link to the first algorithm and transmit the second algorithm to the remote client application.

34. An apparatus comprising:

a server; including a server process running on the server;

a client including a client application remotely located from the server, without any security algorithm installed therein;

the server process to select one of a plurality of security algorithms from a pool of security algorithms, upon a request from the client application for installation a security algorithm selected from said plurality of security algorithms at the client application, and then transmit the selected security algorithm to the client application, the selected security algorithm to be linked with the server process and the client application for use in communication between the client application and server process.

* * * * *